United States Patent
Dahlberg

(10) Patent No.: US 7,140,341 B2
(45) Date of Patent: Nov. 28, 2006

(54) ENERGY STORING STARTER ASSEMBLY

(75) Inventor: Goran Dahlberg, Granna (SE)

(73) Assignee: Aktiebolaget Electrolux, Stockholm (SE)

( * ) Notice: Subject to any disclaimer, the term of this patent is extended or adjusted under 35 U.S.C. 154(b) by 43 days.

(21) Appl. No.: 11/106,071

(22) Filed: Apr. 14, 2005

(65) Prior Publication Data

US 2006/0231055 A1    Oct. 19, 2006

(51) Int. Cl.
  *F02N 3/02*  (2006.01)
  *F03G 1/02*  (2006.01)
(52) U.S. Cl. ...................... 123/185.3; 185/39
(58) Field of Classification Search ............. 123/185.3; 185/39, 40 R, 41 R, 41 A, 41 C
  See application file for complete search history.

(56) References Cited

U.S. PATENT DOCUMENTS

| | | | |
|---|---|---|---|
| 1,116,370 A | 11/1914 | Bendix | |
| 3,010,443 A | 11/1961 | Lyvers | |
| 3,306,277 A | 2/1967 | Gudmundsen | |
| 3,861,374 A | 1/1975 | Dooley et al. | |
| 4,019,490 A | 4/1977 | Reese | |
| 4,068,644 A | 1/1978 | Newport | |
| 4,157,083 A | 6/1979 | Smith et al. | |
| 4,291,654 A | 9/1981 | Obermayer | |
| 4,422,417 A | 12/1983 | Obermayer | |
| 4,434,756 A | 3/1984 | Nilsson et al. | |
| 4,492,190 A | 1/1985 | Greenwood et al. | |
| 4,582,030 A | 4/1986 | Reese | |
| 4,633,832 A | 1/1987 | Andreasson et al. | |
| 4,638,775 A | 1/1987 | Lindstrom | |
| 4,928,643 A | 5/1990 | Kampichler et al. | |
| 5,065,710 A | 11/1991 | Henriksson | |
| 5,159,845 A | 11/1992 | Wada et al. | |
| 5,163,393 A | 11/1992 | Naslund | |
| 5,243,939 A | 9/1993 | Viktorsson et al. | |
| 5,287,832 A * | 2/1994 | Uhl .......................... | 123/185.3 |
| 5,370,008 A | 12/1994 | Landolt | |
| 5,513,607 A | 5/1996 | Doragrip et al. | |
| 5,676,103 A | 10/1997 | Tsunoda et al. | |
| 5,715,783 A | 2/1998 | Osakabe et al. | |
| 6,182,367 B1 | 2/2001 | Janczak | |
| 6,199,529 B1 | 3/2001 | Kuwabara et al. | |
| 6,240,889 B1 | 6/2001 | Kuwabara et al. | |
| 6,363,901 B1 | 4/2002 | Watanabe et al. | |
| 6,374,791 B1 | 4/2002 | Kuwabara et al. | |
| 6,508,220 B1 | 1/2003 | Akaike et al. | |
| 6,588,390 B1 | 7/2003 | Kawasaki et al. | |
| 6,718,931 B1 | 4/2004 | Morishige et al. | |
| 6,739,303 B1 | 5/2004 | Harada et al. | |
| 6,755,170 B1 | 6/2004 | Morishige et al. | |
| 6,755,710 B1 | 6/2004 | Thai | |
| 6,776,133 B1 | 8/2004 | Tezuka et al. | |
| 6,782,863 B1 | 8/2004 | Leasure et al. | |

(Continued)

FOREIGN PATENT DOCUMENTS

DE    4135405    4/1993

(Continued)

*Primary Examiner*—Stephen K. Cronin
*Assistant Examiner*—Arnold Castro
(74) *Attorney, Agent, or Firm*—Pearne & Gordon LLP

(57) ABSTRACT

Energy storing starter assembles include a hub, a pulley, and a torsion spring adapted to resiliently link the hub to the pulley. The torsion spring includes a first end portion adapted to be linked to the hub and a second end portion adapted to be linked to the pulley. The torsion spring further includes at least one resilient member with a first section including a first winding and a second section including a second winding.

21 Claims, 11 Drawing Sheets

U.S. PATENT DOCUMENTS

| | | |
|---|---|---|
| 6,827,055 B1 | 12/2004 | Tsunoda et al. |
| 6,834,633 B1 | 12/2004 | Sing et al. |
| 6,840,207 B1 | 1/2005 | Aiyama et al. |
| 6,901,899 B1 | 6/2005 | Tsunoda |
| 6,901,900 B1 | 6/2005 | Matsubayashi et al. |
| 6,959,680 B1 | 11/2005 | Hashiba |
| 6,959,681 B1 | 11/2005 | Saito |
| 7,004,139 B1 * | 2/2006 | Saito ........................ 123/185.3 |
| 2001/0047786 A1 * | 12/2001 | Kawasaki et al. ........ 123/185.3 |
| 2002/0174848 A1 * | 11/2002 | Nieda et al. ............ 123/185.14 |
| 2003/0094154 A1 | 5/2003 | Morishige et al. |
| 2003/0213455 A1 * | 11/2003 | Tohyama .................. 123/185.3 |
| 2005/0051127 A1 | 3/2005 | Adam et al. |
| 2005/0199212 A1 | 9/2005 | Saito |

FOREIGN PATENT DOCUMENTS

| | | |
|---|---|---|
| DE | 100 40 997 A1 | 4/2001 |
| JP | 6-16964 | 5/1994 |

* cited by examiner

ENERGY STORING STARTER ASSEMBLY

FIELD OF THE INVENTION

This application relates generally to starter assemblies. More specifically, this application relates to starter assemblies for an for an internal combustion engine including an energy storing feature designed to reduce pulling forces required to start the engine.

BACKGROUND OF THE INVENTION

Conventionally, a recoil starter is used with a manually started internal combustion engine, such as a small two-stroke engine, for example. A pulley is provided with a rope wound thereon. During a starting procedure, a handle attached to the distal end of the rope is pulled such that a ratchet and/or clutch mechanism couples the pulley to the flywheel and crankshaft. Continued pulling of the handle allows transmission of rotational energy to a flywheel and crankshaft to facilitate reciprocation of the piston within the piston cylinder. Rotation of the crankshaft drives a piston and helps provide fuel for ignition. Rotation of the flywheel causes a magneto to power a spark plug, creating a spark for ignition of the engine fuel.

In operating such a starter mechanism, abrupt changes in the engine torque may occur due to piston compression of an air/fuel mixture in the piston cylinder. Such abrupt changes can contribute to uneven, jarring, and/or kickback forces when pulling the handle during the starting procedure. These forces can inhibit engine ignition, generate damaging stresses within certain engine components, and the like.

To reduce these fluctuations in pulling force, conventional starter mechanisms are known to include a second rotating member coupled to the pulley by way of a spring. The second rotating member engages with the engine crankshaft, typically using a ratchet mechanism, for transmission of rotational energy. Rotational energy stored within the spring can be used to assist in transmitting a rotational force to the engine crankshaft during periods of higher required torque. Storing rotational energy within the spring can beneficially dampen the pulling force required by the operator and smooth the starting operation. Such a system can be referred to as a buffered recoil system.

Despite this modification, drawbacks in the typical buffered recoil starter systems remain. There is a need to provide a starter device that utilizes a spring to enable starting the engine with a reduced pulling force, while at the same time reducing the inevitable stresses on components of the spring to provide greater durability and reliability.

SUMMARY OF THE INVENTION

In accordance with one aspect, an energy storing starter assembly comprises a hub, a pulley and a torsion spring adapted to resiliently link the hub to the pulley. The torsion spring includes a first end portion adapted to be linked to the hub, a second end portion adapted to be linked to the pulley, and at least one resilient member. The resilient member includes a first section with a first winding and a second section with a second winding. The resilient member winds radially outwardly from the first end portion to form the first winding and then winds radially inwardly to the second end portion to form the second winding.

In accordance with another aspect, an energy storing starter assembly comprises a hub, a pulley and a torsion spring adapted to resiliently link the hub to the pulley. The torsion spring includes a first end portion adapted to be linked to the hub, a second end portion adapted to be linked to the pulley, and at least one resilient member including a first section with a first winding and a second section with a second winding. The first winding includes a plurality of turns substantially positioned along a first plane and the second winding includes a plurality of turns substantially positioned along a second plane offset from the first plane.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Disclosed are various embodiments of an energy storing starter assembly including a hub, a pulley and a torsion spring adapted to resiliently link the hub to the pulley. The starter assembly can facilitate the starting procedure for a wide variety of manually started engines, such as a two-stroke engine. Two stroke engines may be used in a wide range of applications such as gas-powered tools for example. Although not limited to any particular application, the starter assemblies herein can be incorporated a two-stroke engine of a chain saw.

Figure 1:
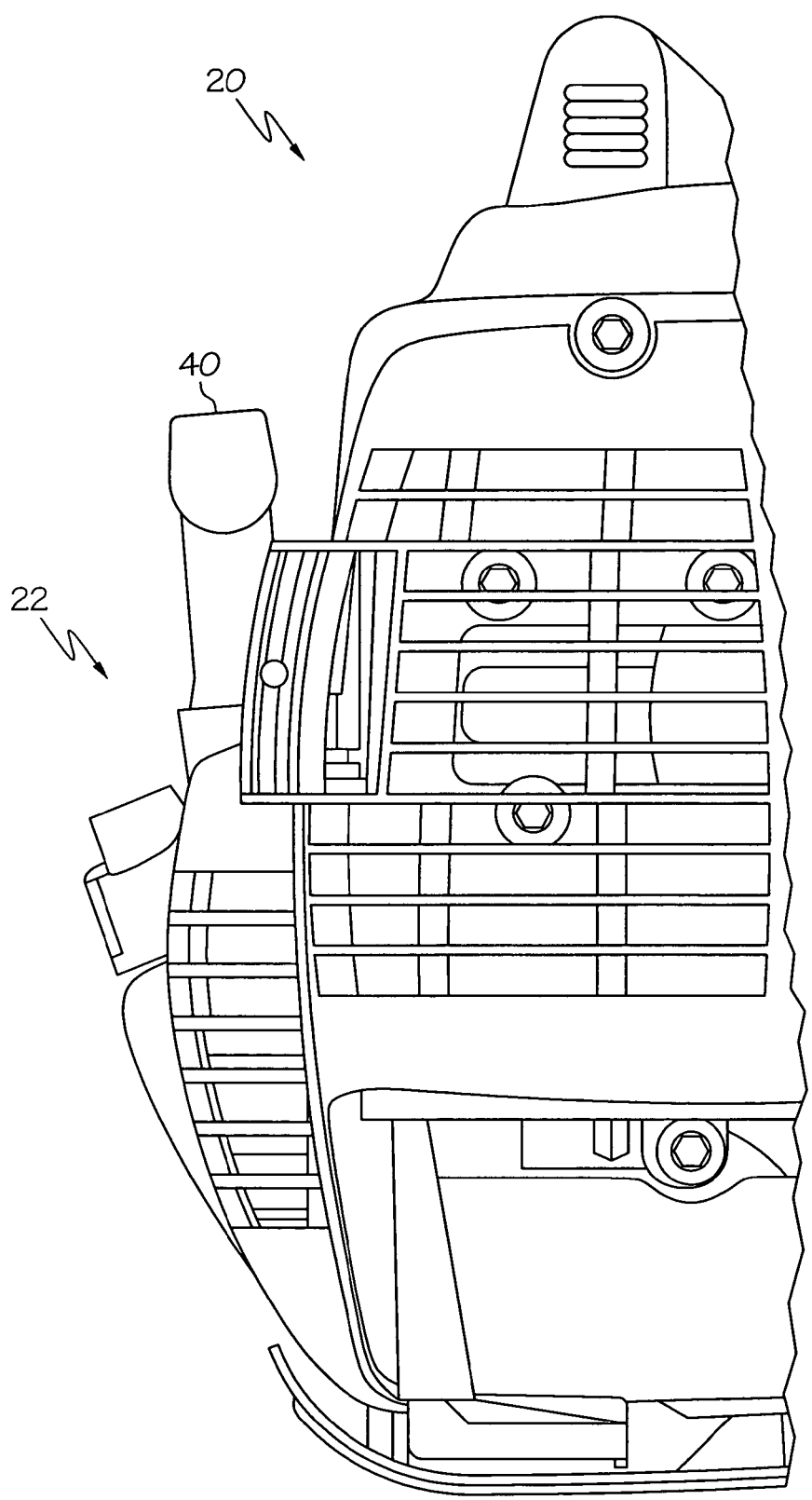
FIG. 1 depicts a partial view of an energy storing starter assembly incorporated in a two-stroke engine.
Figure 2:
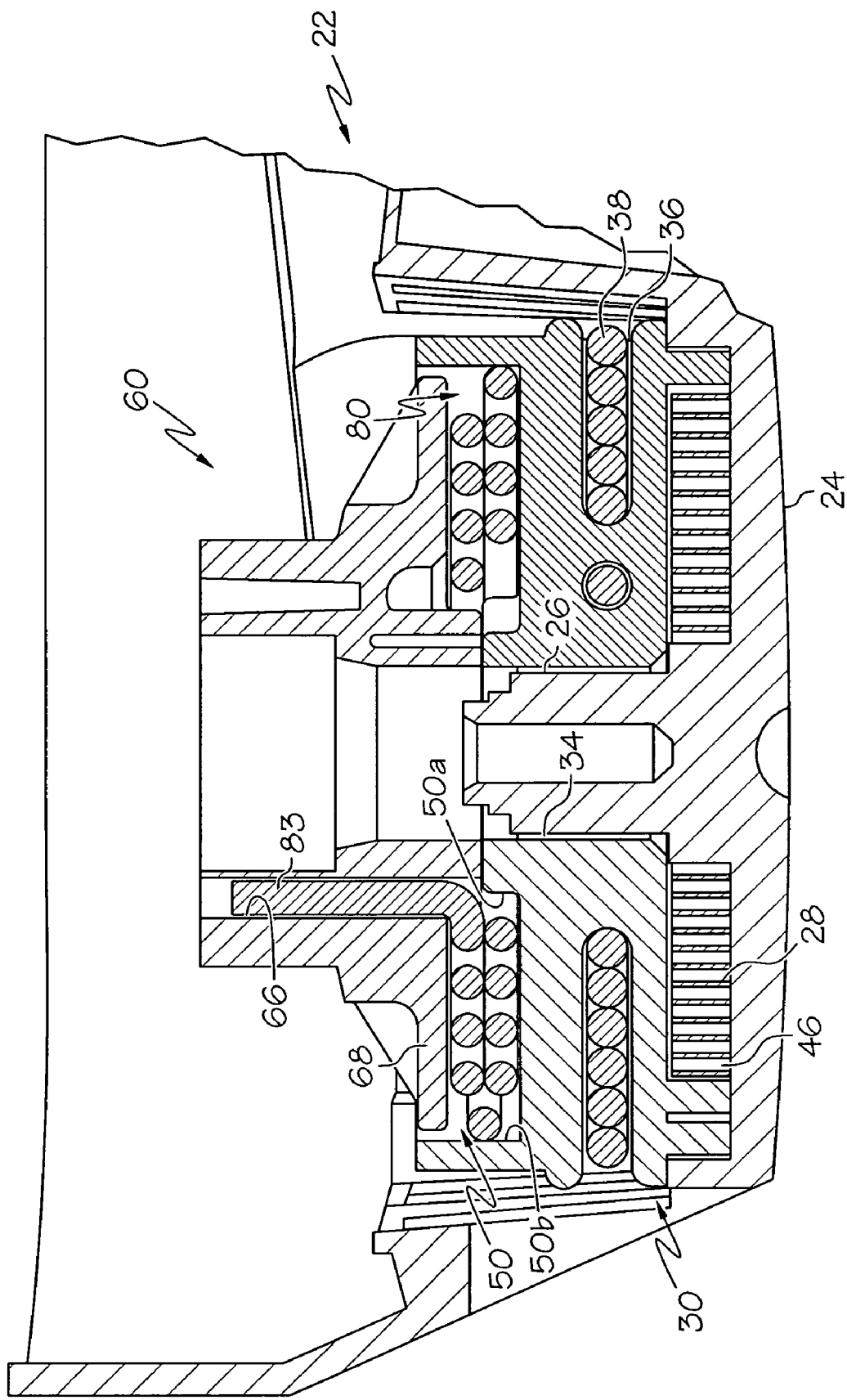
FIG. 2 is cross sectional view of an energy storing starter assembly in accordance with an example embodiment of the present invention.
Figure 2A:
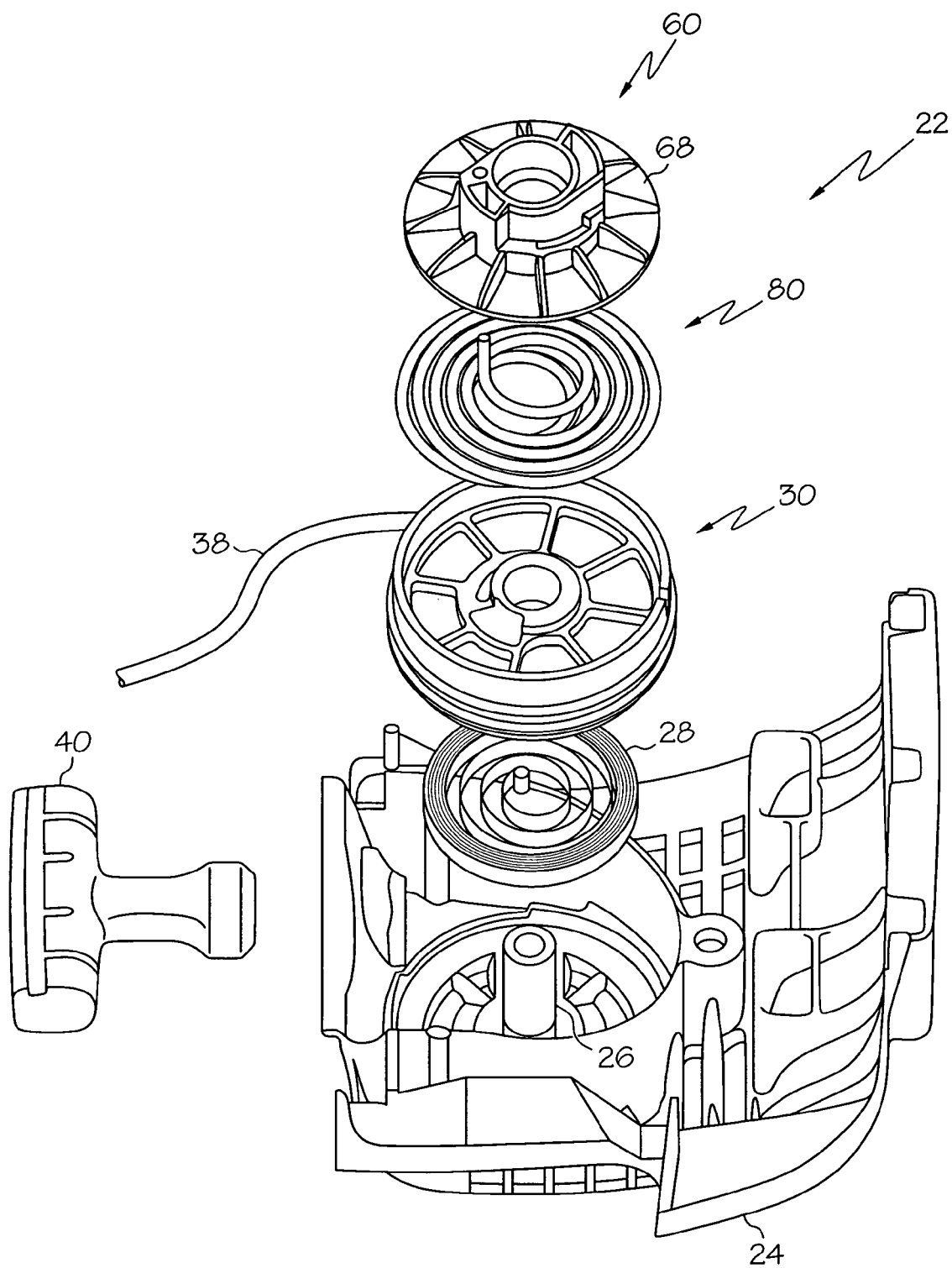
FIG. 2A is an exploded view of an energy storing starter assembly of FIG. 2.

FIG. 1 depicts portions of an engine assembly 20 incorporating an energy storage starter assembly 22 in accordance with one example embodiment of the present invention. As shown in FIGS. 2 and 2A the energy storing starter assembly 22 can include a hub 60, a pulley 30 and a torsion spring 80 adapted to resiliently link the hub 60 to the pulley 30.

Figure 3:
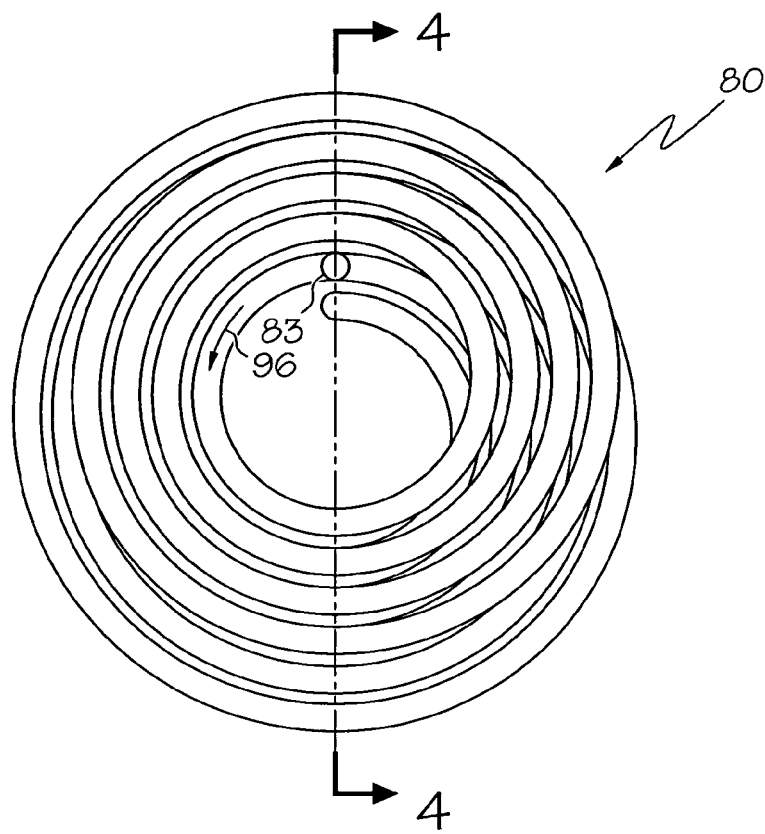
FIG. 3 is a top view of an example torsion spring of the energy storing starter assembly illustrated in FIG. 2.
Figure 4:
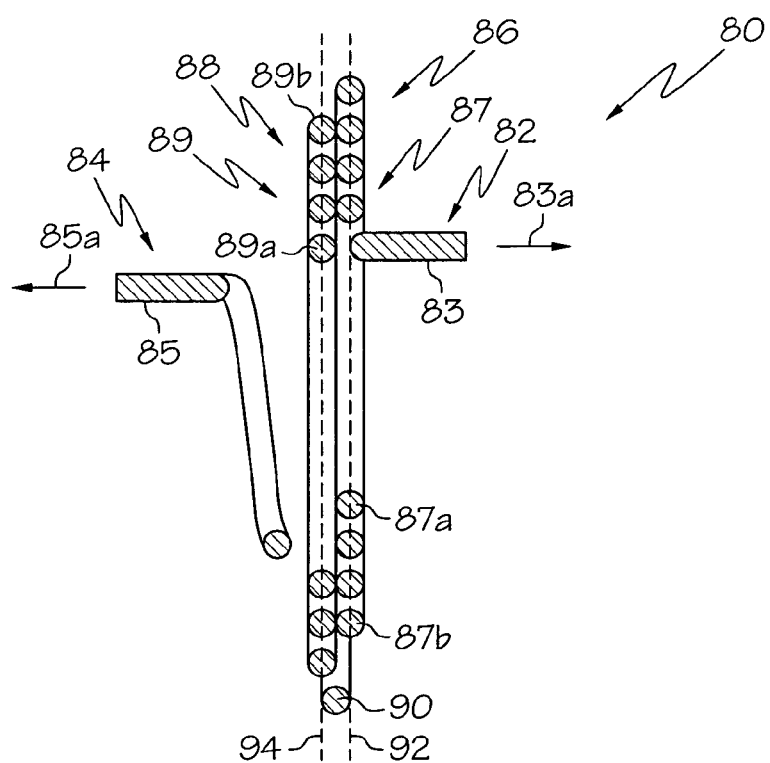
FIG. 4 is a sectional view of the torsion spring along line 4—4 of FIG. 3.

FIGS. 3 and 4 depict the torsion spring 80 in accordance with one example embodiment of the present invention. The torsion spring 80 includes a first end portion 82 adapted to be linked to the hub 60, a second end portion 84 adapted to be linked to the pulley 30, and at least one resilient member. The first and second end portions of the torsion spring may be provided separate from the resilient member. For example, the first and second end portions can comprise end caps or other elements adapted to be connected to ends of the resilient member. Alternatively, as shown, the resilient member and the first and second end portions can be formed from a substantially continuous elongated member.

The first and second end portions 82, 84 can be formed in a wide variety of shapes and configurations. In the illustrated embodiment, the first end portion 82 comprises a first tail 83 and the second end portion 84 comprises a second tail 85. The first tail 83 is adapted to be received in a link aperture 66 of the hub 60 while the second tail 85 is adapted to be received in a link aperture 52 of the pulley 30. As shown, the first and second tails 83, 85 can comprise extensions (e.g., straight extensions) although curved, hooked or other configurations may be used to facilitate respective linking to the hub and pulley. Furthermore, the first and second tails, if provided, may extend from one another in various ways. In the illustrated embodiment, the first tail 83 extends outwardly in a first direction 83a and the second tail 85 extends outwardly in a second direction 85a that is opposite to the first direction. Providing tails that extend in opposite directions can facilitate installation of the torsion spring during the assembly process. The first and second tails may also be located to permit mounting of the torsion spring with the first end being alternatively received by the hub or the pulley and the second end being received by the other of the hub and the pulley. Permitting alternative mounting can reduce assembly time and/or complexity of the assembly process. In further embodiments, the first and second tails may be located to prevent alternative mounting such that the first end portion is only adapted to be received by the hub and the second end portion is only adapted to be received by the pulley. Preventing alternative mounting can provide predictable positioning of the torsion spring with respect to the hub and pulley.

The at least one resilient member of the torsion spring can comprise a single resilient member. In additional embodiments, the at least one resilient member may comprise a plurality of resilient members that are associated, such as connected, with one another to form an overall resilient member forming a component of the torsion spring. The resilient member can comprise a wide range of materials capable of providing a durable member that can store energy during a starting procedure. For example, the resilient member might comprise a spring steel material, polymer, composite material or the like. Still further, the resilient member can comprise a wide range of shapes to provide a resilient structure. In one example, the resilient member comprises a resilient wire that may have various cross sectional shapes. In the illustrated embodiment, the resilient member comprises a resilient wire with a substantially circular cross sectional profile. In alternative embodiments, the resilient wire may comprise an oval, triangular, square, rectangular or other cross sectional shape.

The resilient member of the torsion spring includes at least a first and second section although more sections may be provided. For example, three or more sections may be provided in accordance with aspects of the present invention. In the illustrated embodiment, the resilient member includes a first section 86 including a first winding 87 and a second section 88 with a second winding 89. The first winding and the second winding can each include at least part of a turn or a full turn. Still further, as shown in the illustrated embodiment, the first winding 87 can also include a plurality of turns and the second winding 89 can also include a plurality of turns.

As shown, the plurality of turns of the first winding 87 can include a first inner turn 87a and a first outer turn 87b and the plurality of turns of the second winding 89 can include a second inner turn 89a and a second outer turn 89b. As further illustrated, the torsion spring 80 can be arranged such that the first inner turn 87a is provided with the first end portion 82 and the second inner turn 89a is provided with the second end portion 84. The first outer turn 87b can also attached to the second outer turn 89b in various ways. For example, the outer turns may be linked together, such as fastened together. In the illustrated embodiment, the outer turns are integrally attached together with an integral transition portion 90 although other nonintegral transition portions may be incorporated. As shown in FIGS. 3 and 4, the transition portion 90, if provided, can comprise a partial turn attaching the outer turns together. In further examples, the transition portion can comprise a single or a plurality of turns attaching the outer turns together.

As shown, the resilient member can wind radially outwardly from the first end portion 82 to form the first winding 87 and can then wind radially inwardly to the second end portion 84 to form the second winding 89. For example, the resilient member can wind radially outwardly in a winding direction from the first end portion 82 to form the first winding 87 and can then wind radially inwardly in the same or a different winding direction to the second end portion 84 to form the second winding 89. In the illustrated embodiment, the resilient member winds in the same direction to form the first and second windings. Providing a resilient member that winds in the same direction can facilitate the manufacturing process and allows the constriction of both the first and windings during a first relative rotation between the hub and the pulley and dilation of the first and second windings during a second relative rotation between the hub and the pulley. As shown in FIGS. 3 and 4, the resilient member can wind in the same counterclockwise direction 96 to allow dilation during one relative rotational movement between the pulley and the hub while permitting contraction during an opposite relative rotational movement between the pulley and the hub.

Although not shown, it is contemplated that the resilient member may wind in different, such as opposite directions to form the first and second windings. For example, the resilient member may wind in one of a counterclockwise or clockwise direction to form the first winding and then wind in the other of the counterclockwise or clockwise direction to form the second winding. Allowing the resilient member to wind in different directions can permit constriction of one of the windings and dilation of the other of the windings during one relative rotational movement between the pulley and the hub while permitting dilation of the one winding and constriction of the other winding during an opposite relative movement between the pulley and the hub.

Although not necessary, at least one winding of exemplary embodiments may include at least one turn substantially extending along a plane. For example, in one embodiment, at least one turn of the first winding 87 is substantially positioned along a first plane 92. In another embodiment, at least one turn of the second winding 89 is positioned along a second plane 94. In further embodiments at least one turn of the first winding 87 is substantially positioned along the first plane 92 and at least one turn of the second winding 89 is positioned along the second plane 94 offset from the first plane 92. In the illustrated embodiment the first winding 87 comprises a plurality of turns substantially positioned along the first plane 92 and the second winding 89 also includes a plurality of turns positioned along the second plane 94 offset from the first plane 92. If one or more respective turns are substantially positioned along respective first and second offset planes 92, 94, the planes may be offset such that they are substantially parallel with respect to one another. In further embodiments, the planes may be offset in the vicinity of the torsion spring but may eventually intersect one another at a remote location due to a nonparallel relationship between the planes.

Figure 4A:
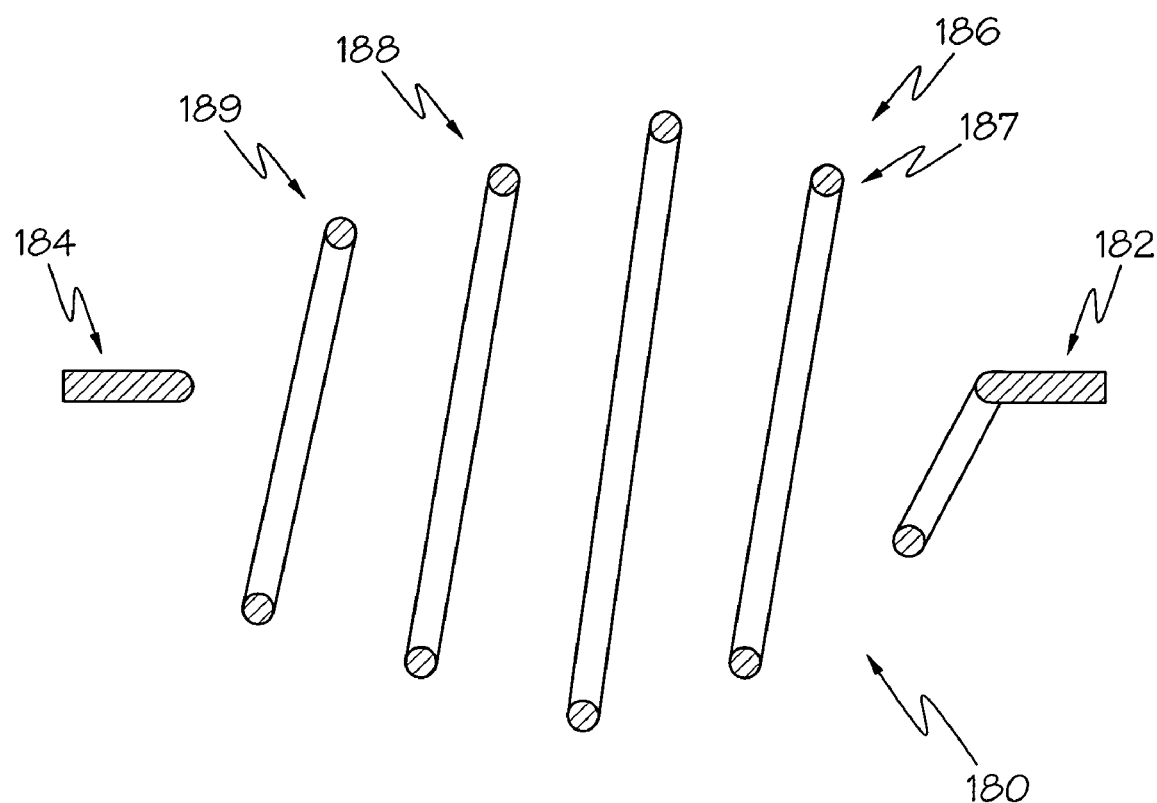
FIG. 4A is a sectional view of a torsion spring in accordance with another example embodiment of the present invention.
Figure 5:
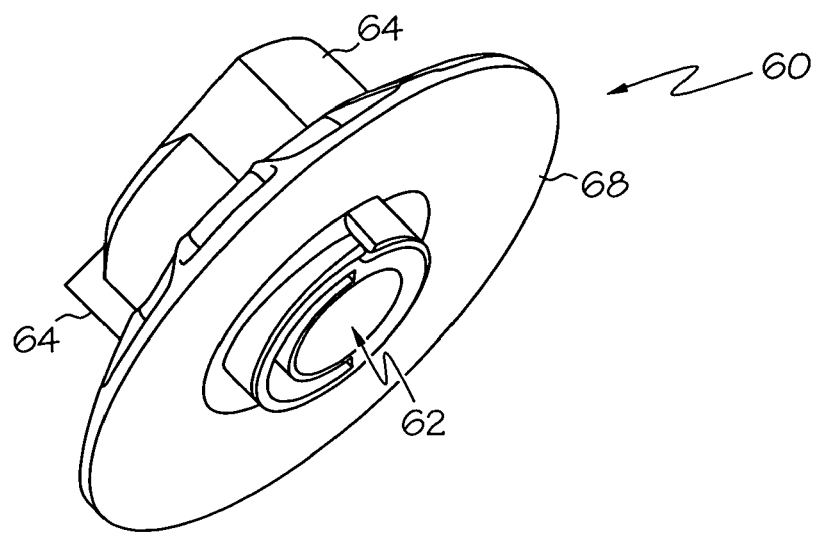
FIG. 5 is a perspective view of an example hub of the energy storing starter assembly illustrated in FIG. 2.
Figure 6:
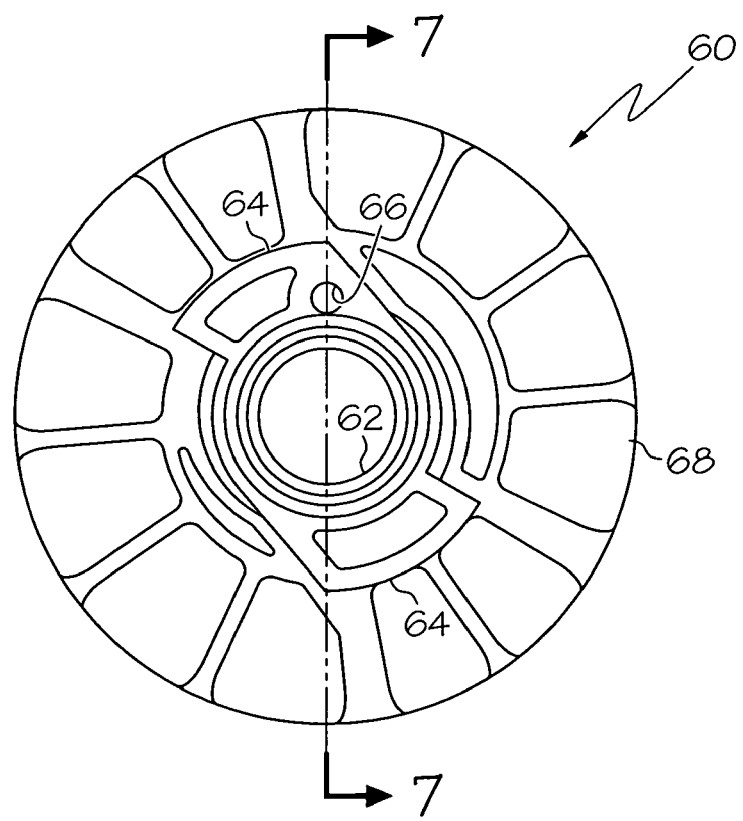
FIG. 6 is a top view of the hub of FIG. 5.
Figure 7:
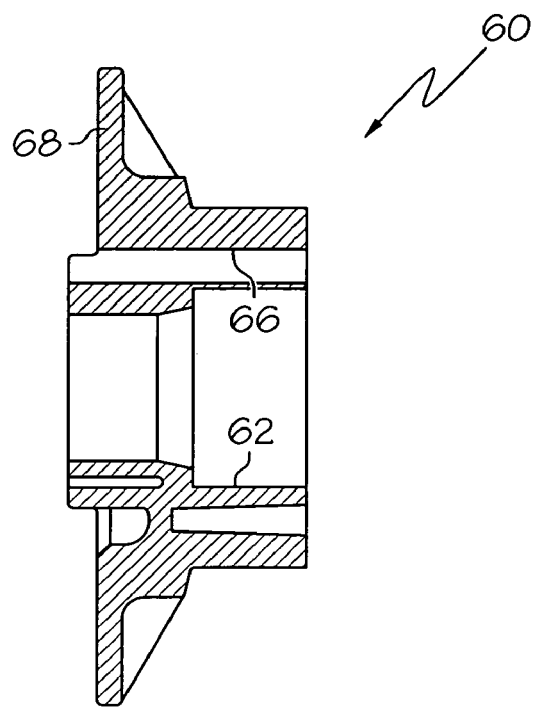
FIG. 7 is a sectional view of the hub along line 7—7 of FIG. 6.
Figure 8:
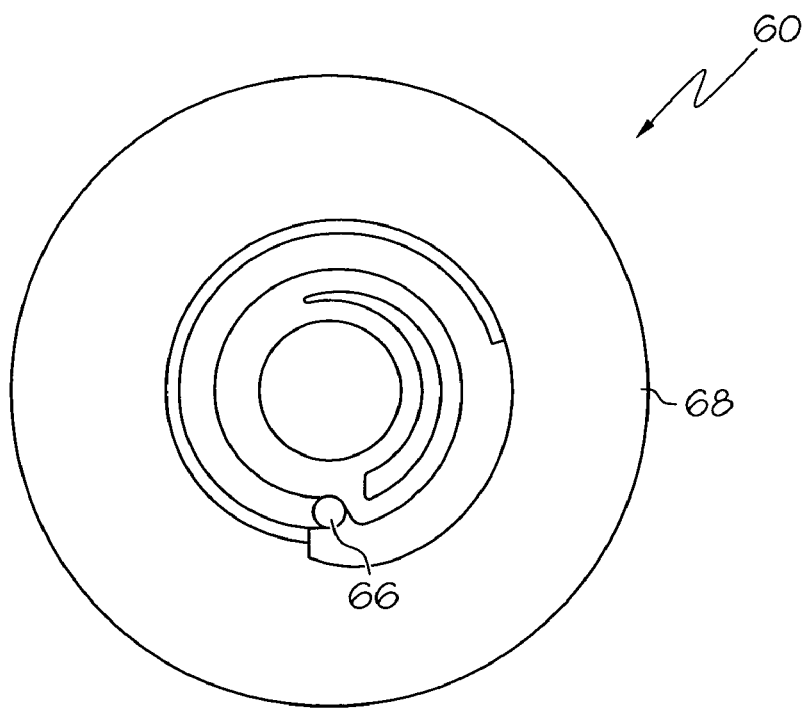
FIG. 8 is a bottom view of the hub of FIG. 5.
Figure 9:
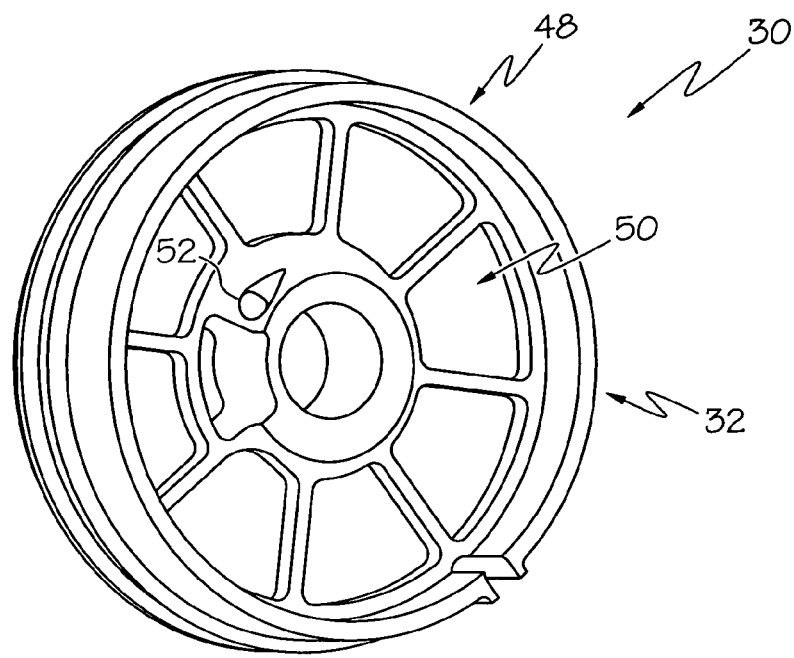
FIG. 9 is a perspective view of an example pulley of the energy storing starter assembly illustrated in FIG. 2.
Figure 10:
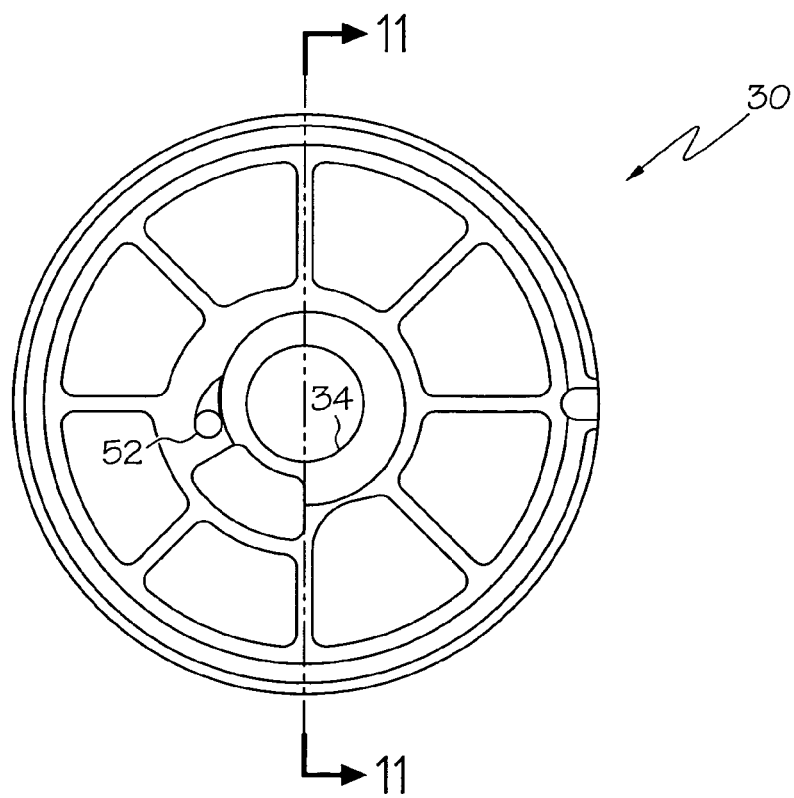
FIG. 10 is a top view of the pulley of FIG. 9.

In further embodiments of the present invention, at least one of the first winding and the second winding includes turns that are not positioned along a plane. For example, FIG. 4A depicts another exemplary torsion spring 180 adapted to resiliently link a hub to a pulley. The torsion spring 180 includes a first end portion 182 adapted to be linked to the hub and a second end portion 184 adapted to be linked to the pulley. The torsion spring 180 further includes at least one resilient member including a first section 186 with a first winding 187 and a second section 188 including a second winding 189. The resilient member winds radially outwardly from the first end portion 182 to form the first section 186 and then winds radially inwardly to the second end portion 184 to form the second section 188. As with the embodiment of FIGS. 3 and 4, the torsion spring 180 can include a resilient member that winds in the same or different directions. For example, the resilient member can wind in the same clockwise or counterclockwise direction to form the first and second windings 187, 189.

FIGS. 5–8 depict the exemplary hub 60 that can be used in accordance with aspects of the present invention. The hub 60 can be adapted to link with an end portion of the torsion spring 80. For example, the hub 60 may include the link aperture 66 adapted to receive the first end portion 82 of the torsion spring 80. The hub 60 can also include ratchet teeth 64 extending about a central aperture 62. The ratchet teeth 64 are adapted facilitate releasable coupling between the hub 60 and a flywheel and/or crankshaft of an engine as described more fully below.

FIGS. 9–16 depict the exemplary pulley 30 that can be used in accordance with aspects of the present invention. The pulley 30 can be adapted to link with an end portion of a torsion spring 80. As shown, for example in FIGS. 12 and 13, the pulley can a body 32 with the link aperture 52 adapted to receive the second end portion 84 of the torsion spring 80.

Figure 11:
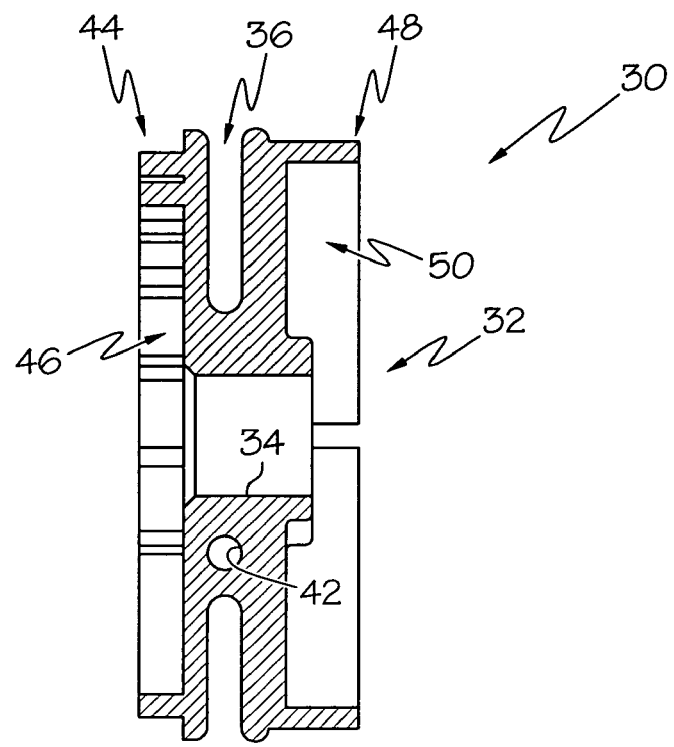
FIG. 11 is a cross sectional view of the pulley along line 11—11 of FIG. 10.
Figure 16:
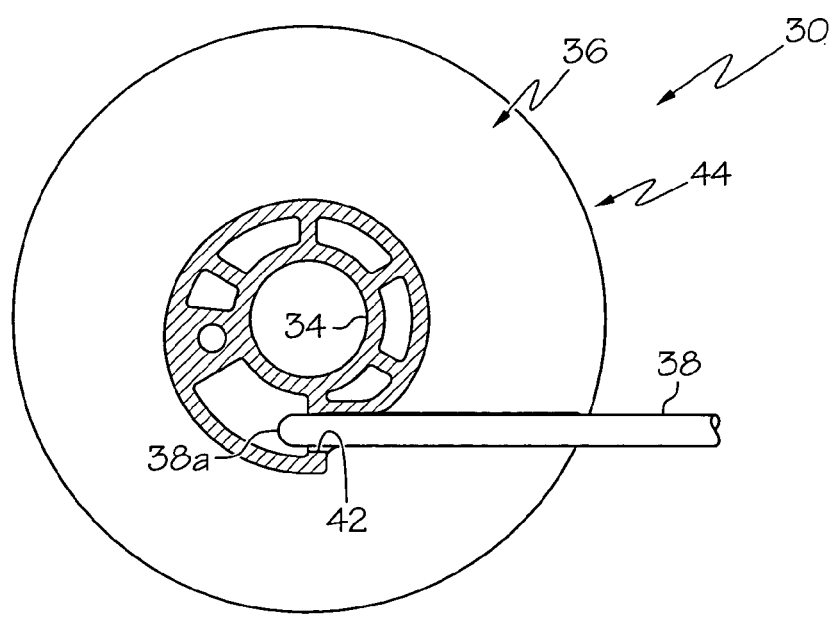
FIG. 16 is a sectional view of the pulley along line 16—16 of FIG. 15.

As shown in FIGS. 2 and 11, the body 32 of the exemplary pulley can also include a central aperture 34 adapted to receive an axel 26 of a housing 24 as shown in FIG. 2. The body 32 can further include a channel 36 positioned between a first body portion 44 and a second body portion 48. The channel 36 is adapted to windingly receive a pull cord 38 as shown in FIG. 2. As shown in FIG. 16, an end portion 38a of the cord 38 may be fastened with respect to a fastening area 42, such as a fastening aperture. The fastening area 42 may be provided with an inward cleat adapted to permit entry while preventing removal of the end portion 38a from the fastening area. Alternatively, a set screw of other fastening method may be employed to fasten the end portion 38a with respect to the fastening area 42.

Figure 12:
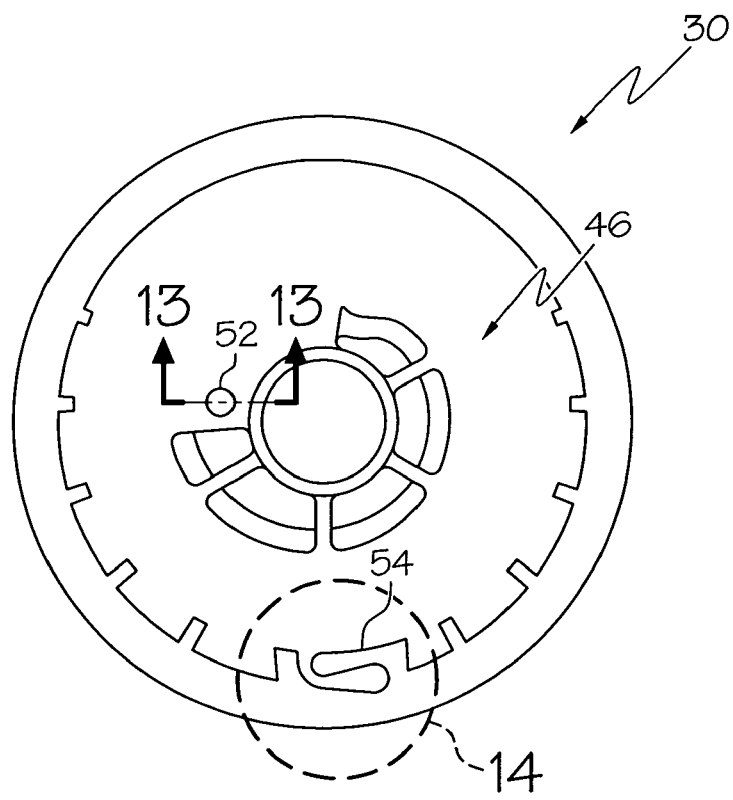
FIG. 12 is a bottom view of the pulley of FIG. 9.
Figure 13:
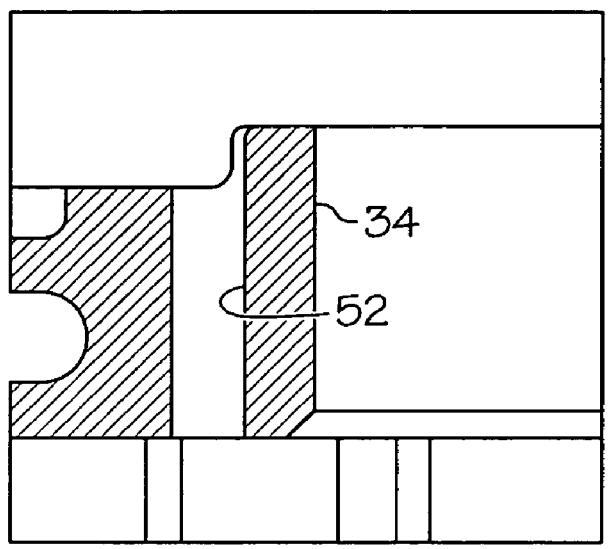
FIG. 13 is a partial sectional view of the pulley along line 13—13 of FIG. 12.
Figure 14:
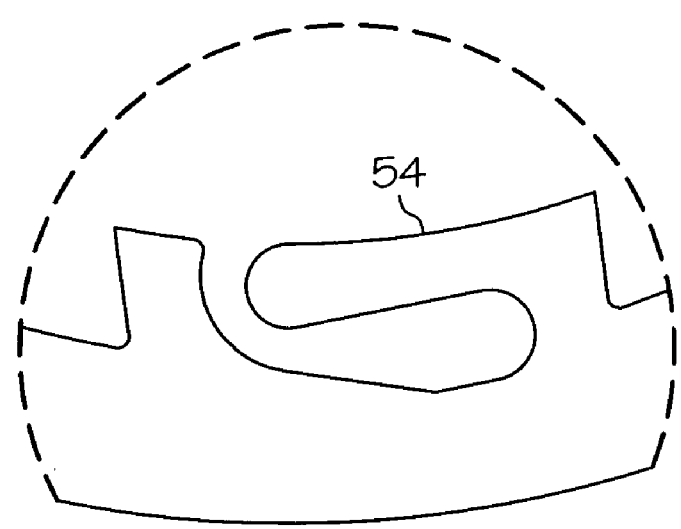
FIG. 14 is an enlarged view of portions of the pulley taken at view 14 of FIG. 12.
Figure 15:
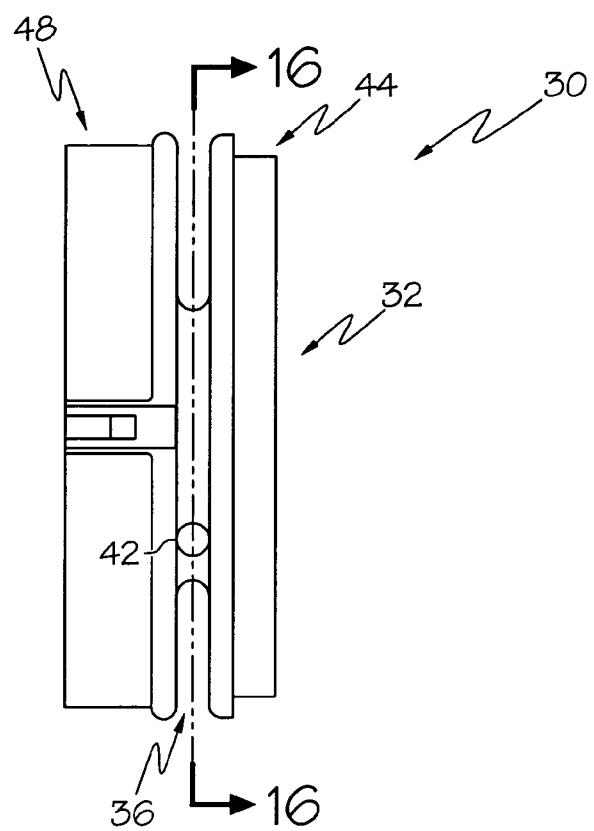
FIG. 15 is a side elevational view of the pulley of FIG. 9.

As illustrated in FIGS. 11 and 12, the first body portion 44 may be formed with a shroud at least partially defining a first area 46. As shown in FIG. 2, the first area 46 is adapted to house a recoil spring 28 of the starter assembly 22. The shroud may include a structure adapted to fasten to an end portion of the recoil spring 28. For example, as shown in FIGS. 12 and 14, the shroud may include a fastening structure 54 designed to provide a keyed connection between the end portion of the recoil spring 28 and the pulley 30. As further illustrated in FIGS. 9–11, the second body portion 48 may be formed with an additional shroud at least partially defining a second area 50. As shown in FIG. 2, the second area 50 is adapted to house the torsion spring 80 of the starter assembly 22.

As shown in FIGS. 2 and 2A, the starter assembly 22 can be designed to facilitate rapid assembly during the manufacturing process. In one example, the starter assembly 22 is assembled by first providing the housing 24 discussed herein. The pulley 30 is provided with the cord 38 wound within the channel 36 of the pulley 30. The recoil spring 28 is then provided and inserted over the axle 26 of the housing 24. One end of the recoil spring 28 is fastened to the housing 24 and the other end of the recoil spring is attached to the fastening structure 54 of the pulley 30. The pulley 30 is then positioned with respect to the housing 24 such that the first area 46 of the first body portion 44 houses the recoil spring 28. The torsion spring 80 is then positioned within the second area 50 of the pulley 30 with the second tail 85 inserted in the link aperture 52 of the pulley 30. The hub 60 is then positioned over the second area 50 such that a circumferential wall 68 of the hub 60 traps the torsion spring 80 within the second area 50 of the pulley 30. The hub 60 is also positioned with the first tail 83 is inserted in the link aperture 66 of the hub 60. A handle 40 may be attached to the distal end of the cord 38 at any time before or after the assembly process.

An example of the energy storing starter assembly can comprise a hub, a pulley and one or more one or more buffering components. At least one of the buffering components comprises a torsion spring adapted to resiliently link the hub to the pulley. The pulley is manually rotatable using, for example, a pull rope attached thereto. The buffering component provides a resilient connection between the pulley and the hub, and is capable of storing energy generated when the pulley is rotated. The buffering component transmits rotational energy from the pulley to the hub. The hub is may be adapted for engagement with an engine flywheel and crankshaft for transmitting rotational energy to the engine. At the same time, the hub may be further adapted to release the engagement with the engine flywheel and crankshaft once the engine has started.

Starter devices 22 of the present invention may be incorporated for use with an engine assembly 20 as shown in FIG. 1. The engine assembly 20 can include a flywheel fixed to a crankshaft. As is known in the art, the crankshaft is linked to a piston of the engine assembly, which operates to compress a supplied fuel/air mixture provided to a cylinder when the crankshaft is rotated.

Once installed, the starter device 22 can engage a flywheel of the engine via a clutch or ratchet mechanism as is known in the art. The clutch mechanism can provide selective engagement between the starter device 22 and the flywheel such that the starter device 22 can transmit torque to the flywheel during a starting procedure while disconnecting from the flywheel once the engine begins operation during a successful starting procedure. The clutch mechanism may be engaged at rest, or can be designed to mechanically engage only during the starting operation when the hub 60 is rotating. In the illustrated example, the ratchet teeth 64 of the hub 60 are adapted to provide an engagement surface for hinged starter dogs, or similar latches, on the flywheel. At rest, the starter dogs can be biased (e.g., by springs) to engage with the ratchet teeth 64 such that the starter device 22 may transmit torque to the flywheel when the hub 60 is rotated in a forward direction. Thus, upon a starting rotation of the hub 60 in a forward direction, the ratchet teeth 64 engage with the starter dogs, thereby transmitting the rotational force of the hub 60 to the flywheel and crankshaft of the engine.

The starter dogs may be spring-loaded or otherwise arranged to operate as a centrifugal clutch. Once the flywheel has reached a predetermined rotational velocity, the starter dogs disengage from the ratchet teeth 64 to disengage the flywheel and crankshaft from the starter assembly 22. Furthermore, as shown in the illustrated embodiment, the ratchet teeth 64 may be formed such that rotational coupling between the hub 60 and the flywheel may only occur when rotating the hub in a forward direction. Thus, the ratchet teeth 64 of the hub can facilitate disengagement of the hub 60 from the flywheel when the hub 60 reduces its rotational velocity with respect to a rotating flywheel or is rotated in a backward direction with respect to the flywheel. In further examples, the clutch mechanism may comprise moving latches on the hub and ratchet teeth on the flywheel, which can provide for a similar engagement between the hub and flywheel.

It is also contemplated that the starter device 22 may optionally be provided in an engine assembly further comprising a spark system having an optional retarded sparking mechanism for igniting the fuel/air mixture. The optional retarded sparking mechanism may slightly delay initial sparking to compensate for the resilient coupling between the hub 60 and the pulley 30. Accordingly, the retarded sparking mechanism can initially retard the spark during the starting procedure to provide the ignition spark at the proper point in time to facilitate engine ignition. The retarded sparking mechanism, if provided, can also be adapted to provide normal spark timing once the engine has started and the flywheel has disengaged from the starter assembly.

It is further contemplated that the hub 60, being a separate component from the pulley 30, may be provided in different materials. Because the hub 60 is exposed to repeated engagement and disengagement with the starter dogs, it may be desirable to construct the hub 60 from a more durable, wear-resistant material, while constructing the pulley 30 from a less durable, more cost efficient material, because the pulley is exposed to relatively lower mechanical stresses in use. In still further examples, the hub 60 and the pulley 30 may be formed from substantially the same material.

The hub and pulley may also be provided with surfaces adapted to accommodate portions of the torsion spring. For example, surfaces of the hub and/or pulley may be inclined or otherwise oriented to match the incline or other position of adjacent portions of the torsion spring. If the torsion spring has inclined portions resting adjacent the hub and/or pulley, for example, the hub and/or pulley may have surfaces with a similar incline to substantially match the slope of the inclined surfaces of the torsion spring. If provided, the corresponding inclines can allow portions of the torsion spring to lie substantially flat against the mating inclined surfaces of the hub and/or pulley.

As further shown in FIG. 2, the second area 50 can act as a restriction cage to limit the amount the torsion spring 80 may dilate or contract. Thus, when the end portions 82, 84 are sufficiently rotated with respect to one another in a first direction, the torsion spring 80 contracts. Similarly, when the end portions 82, 84 are sufficiently rotated with respect to one another in a second direction, the torsion spring 80 dilates. Inner portions 50a and outer portions 50b of the second area 50 can serve to limit the dilation and/or contraction of the torsion spring 80. For example, the inner portions 50a of the second area 50 can limit the extent to which the torsion spring 80 may contract. Similarly, outer portions 50b of the second area 50 can limit the extent to which the torsion spring 80 may dilate. Limiting dilation and/or contraction of the torsion spring 80 can help control buffering action of the starter assembly 22 when the torsion spring 80 stores energy in one direction and/or the other direction, for example.

In use, an operator may simply pull the handle 40 to rotate the pulley 30 against the bias force of the recoil spring 28. The cord 38 thereby unwinds from the channel 36 of the pulley 30 causing the pulley 30 to rotate in a forward rotational direction about the axle 26 of the housing 24. As the pulley 30 rotates, some of the rotational energy is transmitted to the hub 60 by way of the torsion spring 80. As the hub 60 is rotated, the ratchet teeth 64 of the hub 60 engage with a pair of hinged starter dogs attached to an engine flywheel. Rotational energy is thereby transmitted from the starter assembly 22 to the flywheel and crankshaft of the engine. As the pulley 30 rotates, energy is also stored in the torsion spring 80, thereby providing a buffering action. In a possible embodiment, a retarding spark mechanism may be provided to cause a brief delay in the spark to facilitate ignition of the engine.

As the crankshaft is further rotated, the fuel-air mixture is compressed within the piston cylinder and provides an opposing compression force. As the compression force increases, the torsion spring further winds an stores further energy. As the piston reaches and then passes the top dead center point, the stored energy in the torsion spring 80 is at least partially released, thus increasing the speed of the rotation, which can make further pulling easier for the next compression. The act of storing energy in the torsion spring 60 smoothes out the pulling process for the operator, absorbing energy at moments of peak opposition due to compression forces in the cylinder.

Further, as the engine assembly 20 is started and the piston compresses the fuel-air mixture in the cylinder, any kickback by this process can be absorbed by the torsion spring 80, thereby storing energy from the kickback and buffering the kickback force from adversely impacting the operator. The energy absorbed during the kickback may be subsequently used to further aid the starting process.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. An energy storing starter assembly comprising:
   a hub;
   a pulley; and a torsion spring adapted to resiliently link the hub to the pulley, the torsion spring including a first end portion adapted to be linked to the hub, a second end portion adapted to be linked to the pulley, and at least one resilient member including a first section with a first winding and a second section with a second winding, wherein the resilient member winds radially outwardly from the first end portion to form the first winding and then winds radially inwardly to the second end portion to form the second winding.

2. The energy storing starter assembly of claim 1, wherein the first winding includes at least one turn substantially positioned along a first plane.

3. The energy storing starter assembly of claim 2, wherein the second winding includes at least one turn substantially positioned along a second plane offset from the first plane.

4. The energy storing starter assembly of claim 3, wherein the first plane is substantially parallel to the second plane.

5. The energy storing starter assembly of claim 1, wherein the first winding includes a plurality of turns with an inner turn and an outer turn, the second winding includes a plurality of turns with an inner turn and an outer turn, the inner turn of the first winding is provided with the first end portion, the inner turn of the second winding is provided with the second end portion, and the outer turn of the first winding is attached to the outer turn of the second winding.

6. The energy storing starter assembly of claim 5, wherein the resilient member further includes a transition portion attaching the outer turn of the first winding to the outer turn of the second winding.

7. The energy storing starter assembly of claim 1, wherein the resilient member comprises a single resilient member.

8. The energy storing starter assembly of claim 1, wherein the resilient member comprises a resilient wire.

9. The energy storing starter assembly of claim 8, wherein the resilient wire has a substantially circular cross sectional profile.

10. The energy storing starter assembly of claim 1, wherein the resilient member winds in the same direction to form the first and second windings.

11. The energy storing starter assembly of claim 10, wherein the same direction comprises a counterclockwise direction.

12. The energy storing starter assembly of claim 1, wherein the first end portion is also adapted to be linked to the pulley and the second end portion is also adapted to be linked to the hub.

13. The starter assembly of claim 1, wherein the resilient member and the first and second end portions are formed from a substantially continuous elongated member.

14. The starter assembly of claim 1, wherein the first end portion includes a first tail adapted to be linked to the hub, and the second end portion includes a second tail adapted to be linked to the pulley.

15. The starter assembly of claim 14, wherein the first tail extends outwardly in a first direction and the second tail extends outwardly in a second direction that is opposite to the first direction.

16. An energy storing starter assembly comprising:
   a hub;
   a pulley; and
   a torsion spring adapted to resiliently link the hub to the pulley, the torsion spring including a first end portion adapted to be linked to the hub, a second end portion adapted to be linked to the pulley, and at least one resilient member including a first section with a first winding and a second section with a second winding, wherein the first winding includes a plurality of turns substantially positioned along a first plane and the second winding includes a plurality of turns substantially positioned along a second plane offset from the first plane.

17. The energy storing starter assembly of claim 16, wherein the first plane is substantially parallel to the second plane.

18. The energy storing starter assembly of claim 16, wherein the plurality of turns of the first winding includes an inner turn and an outer turn, the plurality of turns of the second winding includes an inner turn and an outer turn, the inner turn of the first winding is provided with the first end portion, the inner turn of the second winding is provided with the second end portion, and the outer turn of the first winding is attached to the outer turn of the second winding.

19. The energy storing starter assembly of claim 18, wherein the resilient member further includes a transition portion attaching the outer turn of the first winding to the outer turn of the second winding.

20. The energy storing starter assembly of claim 16, wherein the resilient member winds radially outwardly in a winding direction from the first end portion to form the first winding and then winds radially inwardly in the winding direction to the second end portion to form the second winding.

21. The energy storing starter assembly of claim 20, wherein the winding direction comprises a counterclockwise direction.

* * * * *